(12) United States Patent
Guo et al.

(10) Patent No.: US 12,645,895 B2
(45) Date of Patent: *Jun. 2, 2026

(54) OPERATION CIRCUIT AND CHIP

(71) Applicant: Shanghai Bright Power Semiconductor Co., Ltd., Shanghai (CN)

(72) Inventors: Yanmei Guo, Shanghai (CN); Zhen Zhu, Shanghai (CN); Yuehui Li, Shanghai (CN); Xiaoru Gao, Shanghai (CN); Yihui Chen, Shanghai (CN); Haifeng Miao, Shanghai (CN); Rulong Jiang, Shanghai (CN)

(73) Assignee: Shanghai Bright Power Semiconductor Co., Ltd., Shanghai (CN)

( * ) Notice: Subject to any disclaimer, the term of this patent is extended or adjusted under 35 U.S.C. 154(b) by 966 days.

This patent is subject to a terminal disclaimer.

(21) Appl. No.: 17/886,093

(22) Filed: Aug. 11, 2022

(65) Prior Publication Data

US 2023/0046618 A1 Feb. 16, 2023

(30) Foreign Application Priority Data

Aug. 12, 2021 (CN) .......................... 202110925657.9

(51) Int. Cl.
G06G 7/16 (2006.01)
H02J 7/34 (2006.01)
(Continued)

(52) U.S. Cl.
CPC ................ G06G 7/16 (2013.01); H02J 7/345 (2013.01); H02J 7/42 (2026.01); H02J 7/927 (2026.01); H02J 2207/50 (2020.01)

(58) Field of Classification Search
CPC .. H02J 7/0047; H02J 7/00304; H02J 7/00309; H02J 7/00034; H02J 7/35;
(Continued)

(56) References Cited

U.S. PATENT DOCUMENTS

2008/0303289 A1* 12/2008 Holliday ................ F02G 1/043
290/40 C
2019/0272056 A1 9/2019 Wang et al.
(Continued)

FOREIGN PATENT DOCUMENTS

CN 111245383 A 6/2020
CN 112234957 A 1/2021

*Primary Examiner* — Binh C Tat

(74) *Attorney, Agent, or Firm* — MUNCY, GEISSLER, OLDS & LOWE, P.C.

(57) ABSTRACT

An operation circuit and a chip pertaining to the field of integrated circuit design technology are disclosed by the present invention. The circuit includes a capacitor charging/discharging module and an error amplification module electrically connected to the capacitor charging/discharging module. The capacitor charging/discharging module is configured to receive first, second and third signals external to the capacitor charging/discharging module, and to output a reference signal and a feedback signal. The error amplification module is configured to receive the reference and feedback signals and output a target signal to the capacitor charging/discharging module based on the received reference and feedback signals. The first, second and third signals are all analog signals, and in a steady state, values of the target, first, second and third signals satisfy a predefined mathematical relationship.

14 Claims, 4 Drawing Sheets

(51) Int. Cl.
H02J 7/42 (2026.01)
H02J 7/90 (2026.01)

(58) Field of Classification Search
CPC .. H02J 7/00; H02J 7/0029; H02J 7/345; H02J 7/00045; H02J 7/0044; H02J 7/342; H02J 7/00711; H02J 7/0013; H02J 7/62; H02J 7/65; H02J 7/42; H02J 7/70; H02J 7/60; H02J 7/47; H02J 7/731; H02J 7/927; G06G 7/16
USPC ................................................ 320/166–167
See application file for complete search history.

(56) References Cited

U.S. PATENT DOCUMENTS

2020/0256521 A1* 8/2020 Xiong ...................... H05K 1/00
2021/0080987 A1* 3/2021 Rodriguez ............ H02M 3/157
2023/0050386 A1* 2/2023 Guo ........................ H02J 7/345

* cited by examiner

OPERATION CIRCUIT AND CHIP

CROSS-REFERENCE TO RELATED APPLICATION

This application claims the priority of Chinese patent application number 202110925657.9, filed on Aug. 12, 2021, the entire contents of which are incorporated herein by reference.

TECHNICAL FIELD

The present invention relates to the field of integrated circuit design technology and, in particular, to an operation circuit and a chip.

BACKGROUND

In the field of electronics, more and more applications involve A*B/C operations of electrical signals (where, A, B or C may be a voltage or a current signal). For example, in some signal processing applications, or by the quick-charge PPS (Programmable Power Supply) protocol, constant-power functions are required. Power is voltage times current. An A*B/C operation may be conducted either by a digital circuit, or by an analog circuit.

In the digital circuit implementation, if A, B, C are analog signals, it is necessary to convert these analog signals to their digital representations using an analog-to-digital converter (A/D converter or ADC). Digital multipliers are based on the shift-and-add method. Digital dividers are based on subtraction and generally require complex hardware. For digital circuits, addition, subtraction or multiplication can be implemented easily, while division is particularly cumbersome for them.

Therefore, it is necessary to provide an operation circuit with simplicity.

SUMMARY OF THE INVENTION

The present invention provides an operation circuit and a chip in order to overcome the problem that existing digital circuits and hardware for multiplication operation and division operation are complex.

In a first aspect, the present invention provides an operation circuit comprising: a capacitor charging/discharging module and an error amplification module electrically connected to the capacitor charging/discharging module, wherein:

the capacitor charging/discharging module is configured to receive a first signal, a second signal and a third signal external to the capacitor charging/discharging module; and to output a reference signal and a feedback signal;

the error amplification module is configured to receive: the reference and feedback signals and output a target signal to the capacitor charging/discharging module based on the received reference and feedback signals;

wherein all the first, second and third signals are analog signals, and in a steady state, a value of the target, a value of the first signal, a value of the second signal and a value of the third signal satisfy a predefined mathematical relationship comprising a factor, the predefined mathematical relationship including a product of the value of the first signal and the value of the second signal divided by the value of the third signal.

In the operation circuit according to the present invention, the capacitor charging/discharging module may comprise a first capacitor charging/discharging sub-module and a second capacitor charging/discharging sub-module, wherein the first capacitor charging/discharging sub-module is configured: to receive the first and second signals, and output the reference signal to the error amplification module based on the first and second signals, wherein the error amplification module is electrically connected to the first capacitor charging/discharging sub-module and is configured to: calculate an error between the reference and feedback signals, and output the target signal, wherein the second capacitor charging/discharging sub-module is electrically connected to the error amplification module and is configured to: receive the third and target signals, and output the feedback signal based on the third and target signals.

In the operation circuit according to the present invention, wherein the first capacitor charging/discharging sub-module may comprise: a first current source, a first capacitor, a first switch, a first comparator, a second switch, a third switch, a fourth switch, a second capacitor and a third capacitor; and wherein the second capacitor charging/discharging sub-module may comprise: a third current source, a fifth switch, a fourth capacitor, a second comparator, a sixth switch, a seventh switch, an eighth switch, a fifth capacitor and a sixth capacitor, wherein: a first terminal of the first switch, a first terminal of the first capacitor and a negative input terminal of the first comparator are electrically connected to the first current source; a second terminal of the first switch and a second terminal of the first capacitor are grounded; a positive input terminal of the first comparator is configured to receive the second signal; an output terminal of the first comparator is electrically connected to a control terminal of the second switch to switch on/off the second switch; a first terminal of the second switch is electrically connected to the second current source to receive the first signal; a second terminal of the second switch is electrically connected to a first terminal of the third switch, a first terminal of the second capacitor and a first terminal of the fourth switch; a first input terminal of the error amplification module is electrically connected to a second terminal of the fourth switch and a first terminal of the third capacitor to receive the reference signal; and a second terminal of the third switch, a second terminal of the second capacitor and a second terminal of the third capacitor are grounded, wherein: a first terminal of the fifth switch, a first terminal of the fourth capacitor and a negative input terminal of the second comparator are electrically connected to an output terminal of the third current source; a second terminal of the fifth switch and a second terminal of the fourth capacitor are grounded; a positive input terminal of the second comparator is configured to receive the third signal; an output terminal of the second comparator is electrically connected to a control terminal of the sixth switch to switch on/off the sixth switch; a second terminal of the sixth switch is electrically connected to each of a first terminal of the seventh switch, a first terminal of the fifth capacitor and a first terminal of the eighth switch; a second input terminal of the error amplification module is electrically connected to a second terminal of the eighth switch and a first terminal of the sixth capacitor to receive the feedback signal; a second terminal of the seventh switch, a second terminal of the fifth capacitor and a second terminal of sixth capacitor are grounded and, wherein an output terminal of the error amplification module is electrically connected to a first terminal of the sixth switch to output the target signal.

In the operation circuit according to the present invention, the first capacitor charging/discharging sub-module may further comprise a first pulse source and a second pulse source and wherein the second capacitor charging/discharging sub-module may further comprise a third pulse source and a fourth pulse source, wherein: a control terminal of the first switch and a control terminal of the third switch are electrically connected to the first pulse source to receive a first pulse at a fixed frequency so as to switch on/off the first and third switches; and a control terminal of the fourth switch is coupled to the second pulse source to receive a second pulse at a fixed frequency so as to switch on/off the fourth switch, and wherein the second pulse comprises a plurality of rising edges aligned with a plurality of falling edges of a signal output from the first comparator, and wherein a control terminal of the fifth switch and a control terminal of the seventh switch are coupled to the third pulse source to receive a third pulse at a fixed frequency so as to switch on/off the fifth and seventh switches; and a control terminal of the eighth switch is coupled to the fourth pulse source to receive a fourth pulse at a fixed frequency so as to switch on/off the eighth switch; and wherein the fourth pulse comprises a plurality of rising edges aligned with a plurality of falling edges of a signal output from the second comparator.

In the operation circuit according to the present invention, the first switch may be configured to discharge the first capacitor within a first preset period, wherein a capacitance of the second capacitor is proportional to a capacitance of the first capacitor, wherein the third switch is configured to discharge the second capacitor within a second preset period, wherein the output signal from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, wherein the fifth switch is configured to discharge the fourth capacitor within a third preset period, wherein a capacitance of the fifth capacitor is proportional to a value of the fourth capacitor, wherein the seventh switch is configured to discharge the fifth capacitor within a fourth preset period, wherein the signal output from the second comparator controls a charging duration of the fifth capacitor by switching the sixth switch on/off, wherein the eighth switch and the sixth capacitor form a peak voltage sampling circuit, and wherein a capacitance of the sixth capacitor is much smaller than the capacitance of the fifth capacitor, and wherein the error amplification module comprises an OTA.

In the operation circuit according to the present invention, a value of the target signal may be proportional to a product of the capacitance of the first capacitor, the value of the second signal, the value of the first signal, a value of a signal output from the third current source and the capacitance of the fifth capacitor divided by a product of a value of a signal output from the first current source, the capacitance of the second capacitor, the capacitance of the fourth capacitor and the value of the third signal.

In the operation circuit according to the present invention, the second capacitor charging/discharging sub-module may further comprise a fifth current source, and wherein an output terminal of the fifth current source is electrically connected to the first terminal of the sixth switch and the output terminal of the error amplification module.

In the operation circuit according to the present invention, a sum of the value of the target signal and a value of a signal output from the fifth current source may be proportional to a product of the capacitance of the first capacitor, the value of the second signal, the value of the first signal, the value of the signal output from the third current source and the capacitance of the fifth capacitor divided by a product of the value of the signal output from the first current source, the capacitance of the second capacitor, the capacitance of the fourth capacitor and the value of the third signal.

In a second aspect, the present invention also provides a chip comprising the operation circuit, wherein the operation circuit comprises: a capacitor charging/discharging module; and an error amplification module electrically connected to the capacitor charging/discharging module, wherein:

the capacitor charging/discharging module is configured to receive a first signal, a second signal and a third signal that are external to the capacitor charging/discharging module, and to output a reference signal and a feedback signal;

the error amplification module is configured to: receive the reference and feedback signals and output a target signal to the capacitor charging/discharging module based on the received reference and feedback signals;

wherein all the first, second and third signals are analog signals, and in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal.

In the chip according to the present invention, the capacitor charging/discharging module may comprise a first capacitor charging/discharging sub-module and a second capacitor charging/discharging sub-module, wherein the first capacitor charging/discharging sub-module is configured to: receive the first and second signals and output the reference signal to the error amplification module based on the first and second signals, wherein the error amplification module is electrically connected to the first capacitor charging/discharging sub-module and is configured to: calculate an error between the reference and feedback signals, and output the target signal, wherein the second capacitor charging/discharging sub-module is electrically connected to the error amplification module and is configured to: receive the third and target signals, and output the feedback signal based on the third and target signals.

In the chip according to the present invention, the first capacitor charging/discharging sub-module may comprise: a first current source, a first capacitor, a first switch, a first comparator, a second switch, a third switch, a fourth switch, a second capacitor and a third capacitor; and wherein the second capacitor charging/discharging sub-module comprises: a third current source, a fifth switch, a fourth capacitor, a second comparator, a sixth switch, a seventh switch, an eighth switch, a fifth capacitor and a sixth capacitor, wherein: a first terminal of the first switch, a first terminal of the first capacitor and a negative input terminal of the first comparator are electrically connected to the first current source; a second terminal of the first switch and a second terminal of the first capacitor are grounded; a positive input terminal of the first comparator is configured to receive the second signal; an output terminal of the first comparator is electrically connected to a control terminal of the second switch to switch on/off the second switch; a first terminal of the second switch is electrically connected to the second current source to receive the first signal; a second terminal of the second switch is electrically connected to each of a first terminal of the third switch, a first terminal of the second capacitor and a first terminal of the fourth switch; a first input terminal of the error amplification module is electrically connected to a second terminal of the fourth switch and a first terminal of the third capacitor to receive the reference signal; a second terminal of the third switch, a second terminal of the second capacitor and a second terminal of the third capacitor are grounded, wherein: a first terminal of the fifth switch, a first terminal of the fourth capacitor and a negative input terminal of the second comparator are electrically connected to an output terminal of the third current source; a second terminal of the fifth switch and a second terminal of the fourth capacitor are grounded; a positive input terminal of the second comparator is configured to receive the third signal; an output terminal of the second comparator is electrically connected to a control terminal of the sixth switch to switch on/off the sixth switch; a second terminal of the sixth switch is electrically connected to each of a first terminal of the seventh switch, a first terminal of the fifth capacitor and a first terminal of the eighth switch; a second input terminal of the error amplification module is electrically connected to a second terminal of the eighth switch and a first terminal of the sixth capacitor to receive the feedback signal; and a second terminal of the seventh switch, a second terminal of the fifth capacitor and a second terminal of sixth capacitor are grounded, and wherein an output terminal of the error amplification module is electrically connected to a first terminal of the sixth switch to output the target signal.

In the chip according to the present invention, the first capacitor charging/discharging sub-module may further comprise a first pulse source and a second pulse source, and wherein the second capacitor charging/discharging sub-module further comprises a third pulse source and a fourth pulse source, wherein: a control terminal of the first switch and a control terminal of the third switch are electrically connected to the first pulse source to receive a first pulse at a fixed frequency so as to switch on/off the first and third switches; and a control terminal of the fourth switch is coupled to the second pulse source to receive a second pulse at a fixed frequency so as to switch on/off the fourth switch, and wherein the second pulse comprises a plurality of rising edges aligned with a plurality of falling edges of a signal output from the first comparator, and wherein a control terminal of the fifth switch and a control terminal of seventh switch are coupled to the third pulse source to receive a third pulse at a fixed frequency so as to switch on/off the fifth and seventh switches; and a control terminal of the eighth switch is coupled to the fourth pulse source to receive a fourth pulse at a fixed frequency so as to switch on/off the eighth switch, and wherein the fourth pulse comprises a plurality of rising edges aligned with a plurality of falling edges of a signal output from the second comparator.

In the chip according to the present invention, the first switch may be configured to discharge the first capacitor within a first preset period, wherein a capacitance of the second capacitor is proportional to a capacitance of the first capacitor, wherein the third switch is configured to discharge the second capacitor within a second preset period, wherein the signal output from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, wherein the fifth switch is configured to discharge the fourth capacitor within a third preset period, wherein a capacitance of the fifth capacitor is proportional to a capacitance of the fourth capacitor, wherein the seventh switch is configured to discharge the fifth capacitor within a fourth preset period, wherein the signal output from the second comparator controls a charging duration of the fifth capacitor by switching the sixth switch on/off, wherein the eighth switch and the sixth capacitor form a peak voltage sampling circuit, and wherein a capacitance of the sixth capacitor is much smaller than the capacitance of the fifth capacitor, and wherein the error amplification module comprises an OTA.

In the chip according to the present invention, a value of the target signal may be proportional to a product of the capacitance of the first capacitor, the value of the second signal, the value of the first signal, a value of a signal output from the third current source and the capacitance of the fifth capacitor divided by a product of a value of a signal output from the first current source, the capacitance of the second capacitor, the capacitance of the fourth capacitor and the value of the third signal.

In the chip according to the present invention, the second capacitor charging/discharging sub-module may further comprise a fifth current source, and wherein an output terminal of the fifth current source is electrically connected to the first terminal of the sixth switch and the output terminal of the error amplification module.

In the chip according to the present invention, a sum of the value of the target signal and a value of a signal output from the fifth current source may be proportional to a product of the capacitance of the first capacitor, the value of the second signal, the value of the first signal, the value of the signal output from the third current source and the capacitance of the fifth capacitor divided by a product of the value of the signal output from the first current source, the capacitance of the second capacitor, the capacitance of the fourth capacitor and the value of the third signal.

In the operation circuit and chip proposed in the present invention, with the capacitor charging/discharging module and the error amplification module, multiplication operation and division operation of electrical signals can be easily performed using stepwise approximation. The operation chip can be flexibly used in various circuits.

BRIEF DESCRIPTION OF THE DRAWINGS

In order to more clearly explain embodiments of the present invention or the prior art, the accompanying drawings, to which reference is to be made in connection with the following description of the embodiments or the prior art, will be briefed below. Apparently, these drawings show only some embodiments of the invention, and those of ordinary skill in the art can obtain other drawings in light of those contained herein, without paying any creative effort.

DETAILED DESCRIPTION

Embodiments of the present invention will be described clearly and fully hereunder in conjunction with the appended drawings so that objects, aspects and advantages of the invention will become more apparent. Evidently, the embodiments set forth herein are merely some but not all possible embodiments of this invention. Any and all other embodiments devisable by skilled artisans in light of the disclosed embodiments without paying any creative effort are considered to fall within the scope of protection of this invention.

The terms "first," "second," and the like in the description, claims and drawings of this application are used for distinguishing between similar elements and not necessarily for describing a particular sequential or chronological order. It is to be understood that the terms so used are interchangeable under appropriate circumstances such that the embodiments described herein are capable of operation in sequences other than those illustrated or otherwise described herein.

In order to overcome the problem that existing digital circuits and hardware for multiplication operation and division operation are complex, the present invention provides an operation circuit which can readily perform multiplication and division operations of electrical signals simply using a capacitor charging/discharging module and an error amplification module.

The operation circuit and chip proposed in the present invention will be described below with reference to FIGS. 1 to 5.

Embodiment 1

Figure 1:
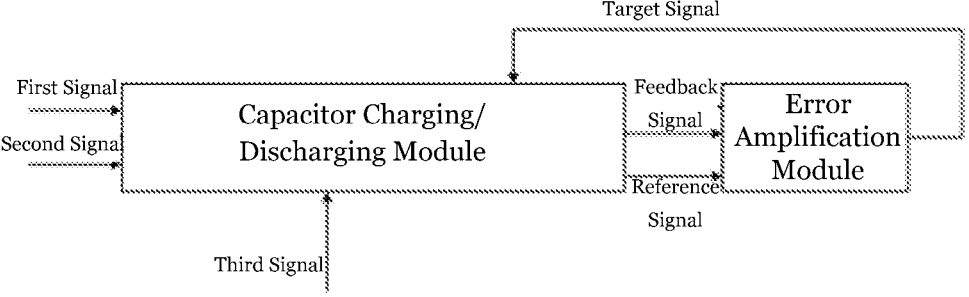
FIG. 1 is a schematic diagram of an operation circuit according to a first embodiment in the present invention.

FIG. 1 is a schematic diagram of the operation circuit according to a first embodiment proposed in the present invention. As shown in FIG. 1, the operation circuit proposed in the present invention includes a capacitor charging/discharging module and an error amplification module electrically connected to the capacitor charging/discharging module.

The capacitor charging/discharging module is configured to receive the first signal, the second signal and the third signal that are external to the capacitor charging/discharging module and output a reference signal and a feedback signal.

The error amplification module is configured to receive the reference and feedback signals and output, based on the reference and feedback signals, a target signal to the capacitor charging/discharging module.

The first, second and third signals are analog signals. In a steady state, values of the target, first, second and third signals would satisfy a predefined mathematical relationship comprising a factor, the predefined mathematical relationship including a product of the value of the first signal and the value of the second signal divided by the value of the third signal, i.e., Target Signal=First Signal*Second Signal/Third Signal.

Embodiment 2

Figure 2:
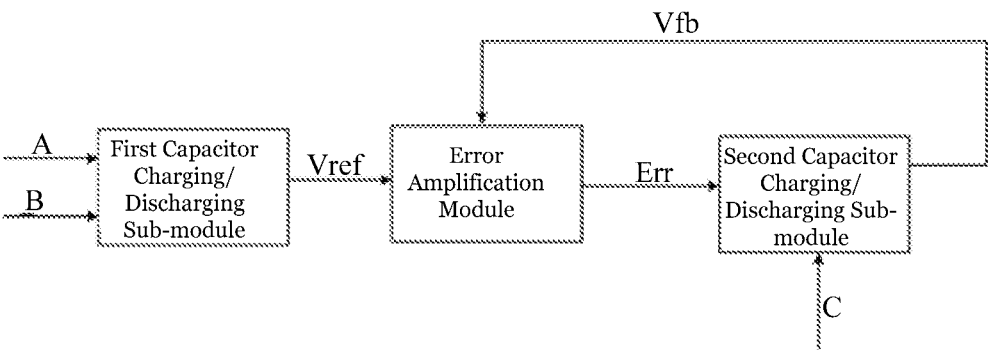
FIG. 2 is a schematic diagram of the operation circuit according to a second embodiment in the present invention.

FIG. 2 is a schematic diagram of the operation circuit according to a second embodiment proposed in the present invention. As shown in FIG. 2, the capacitor charging/discharging module includes a first capacitor charging/discharging sub-module and a second capacitor charging/discharging sub-module.

The first capacitor charging/discharging sub-module is configured to: receive the first signal A and the second signal B that are external to the capacitor charging/discharging sub module and output, based on the first signal A and the second signal B, the reference signal Vref to the error amplification module. The reference signal Vref comprises information of the first signal A and the second signal B.

The error amplification module is electrically connected to the first capacitor charging/discharging sub-module and is configured to: calculate an error between the reference signal Vref and the feedback signal Vfb output from the second capacitor charging/discharging sub-module, and output the target signal Err to the second capacitor charging/discharging sub-module.

The second capacitor charging/discharging sub-module is electrically connected to the error amplification module and is configured to: receive the target signal Err and the third signal C and output the feedback signal Vfb based on the third signal C and the target signal Err.

Likewise, in a steady state, Target Signal=K*A*B/C, where K is a proportional factor. In implementations, this factor is determined by the size of a capacitor or current source. Additionally, K may be modified or adjusted by the target signal Err.

It is to be noted that in Embodiment 1 of the present invention, the error amplification module is disposed upstream of the second capacitor charging/discharging sub-module. The target signal is output by the operation circuit of the present invention.

In Embodiment 2 of the present invention, the target signal can be sampled and output from an output terminal of the operation circuit, which is arranged in the second capacitor charging/discharging sub-module.

Thus, according to the present invention, the output signal of the operation circuit can be made to satisfy a predefined operation expression by using capacitor charging/discharging, closed loop, feedback and other techniques.

Specific circuit implementations of Embodiment, including implementation 1 and Implementation 2 below, will be described.

Figure 3:
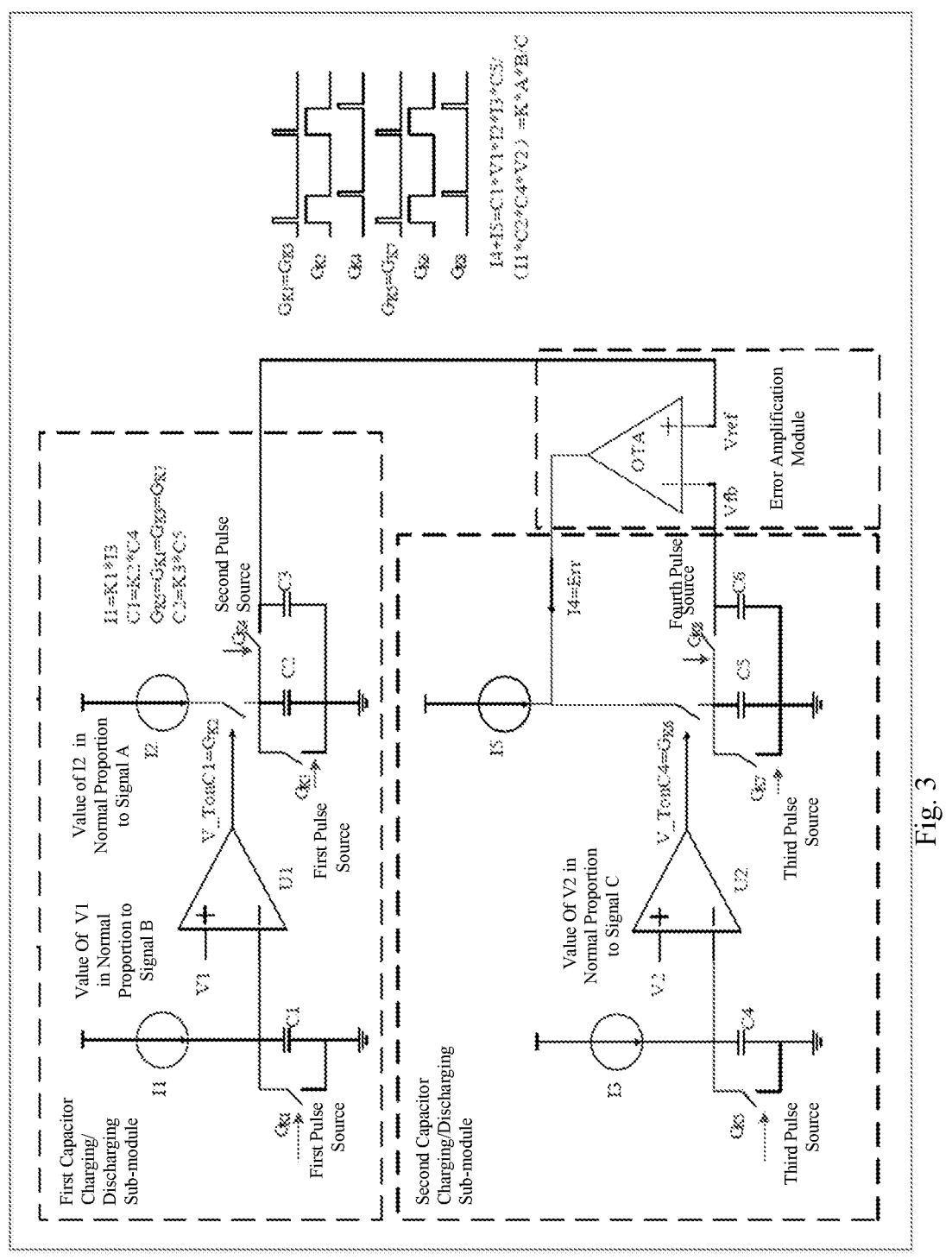
FIG. 3 is a schematic circuit diagram of an exemplary implementation of FIG. 2.

Implementation 1:

FIG. 3 is a schematic circuit diagram of an implementation of FIG. 2.

As shown in FIG. 3, the first capacitor charging/discharging sub-module includes a first current source I1, a first capacitor C1, a first switch K1, a first comparator U1, a second switch K2, a third switch K3, a fourth switch K4, a second capacitor C2 and a third capacitor C3.

The second capacitor charging/discharging sub-module includes a third current source I3, a fifth current source I5, a fifth switch K5, a fourth capacitor C4, a second comparator U2, a sixth switch K6, a seventh switch K7, an eighth switch K8, a fifth capacitor C5 and a sixth capacitor C6. The error amplification module is composed of an OTA (Operational Transimpedance Amplifier).

The connections of the components in the first capacitor charging/discharging sub-module are described below.

A first terminal of the first switch K1, a first terminal of the first capacitor C1 and a negative (−) output terminal of the first comparator U1 are electrically connected to the first current source; and a second terminal of the first switch K1 and a second terminal of the first capacitor C1 are grounded.

A positive (+) input terminal of the first comparator U1 is configured to receive the second signal B that is external to the first comparator U1, and an output terminal of the first comparator U1 is electrically connected to a control terminal of the second switch K2 to switch on/off the second switch K2. A first terminal of the second switch K2 is electrically connected to the second current source I2 to receive the first signal A; and a second terminal of the second switch K2 is electrically connected to each of a first terminal of the third switch K3, a first terminal of the second capacitor C2 and a first terminal of the fourth switch K4. A positive (+) input terminal (i.e., first input terminal) of the error amplification module is electrically connected to a second terminal of the fourth switch K4 and a first terminal of the third capacitor C3 to receive the reference signal Vref. A second terminal of the third switch K3, a second terminal of the second capacitor C2 and a second terminal of the third capacitor C3 are all grounded.

The connections of the components in the second capacitor charging/discharging sub-module are described below.

A first terminal of the fifth switch K5, a first terminal of the fourth capacitor C4 and a negative (−) input terminal of the second comparator U2 are electrically connected to an output terminal of the third current source I3; and a second terminal of the fifth switch K5 and a second terminal of the fourth capacitor C4 are grounded.

A positive (+) input terminal of the second comparator U2 is configured to receive the third signal C, and an output terminal of the second comparator U2 is electrically connected to a control terminal of the sixth switch K6 to switch on/off the sixth switch. A second terminal of the sixth switch K6 is electrically connected to each of a first terminal of the seventh switch K7, a first terminal of the fifth capacitor C5 and a first terminal of the eighth switch K8; and a negative (−) input terminal (i.e., second input terminal) of the error amplification module is electrically connected to both a second terminal of the eighth switch K8 and a first terminal of the sixth capacitor C6 to enable reception of the feedback signal Vfb. A second terminal of the seventh switch K7, a second terminal of the fifth capacitor C5 and a second terminal of the sixth capacitor C6 are all grounded. An output terminal of the fifth current source I5 is electrically connected to a first terminal of the sixth switch K6 and an output terminal of the error amplification module.

The output terminal of the error amplification module (from which the target signal Err is output in the form of a current I4) is electrically connected to the first terminal of the sixth switch K6 to output the target signal.

Drive signals for the aforementioned first to eighth switches (K1-K8) are respectively denoted by $G_{k1}$, $G_{k2}$, $G_{k3}$, $G_{k4}$, $G_{k5}$, $G_{k6}$, $G_{k7}$ and $G_{k8}$.

Optionally, the first capacitor charging/discharging sub-module further includes a first pulse source and a second pulse source; and the second capacitor charging/discharging sub-module further includes a third pulse source and a fourth pulse source. In this case, the drive signals $G_{k1}$, $G_{k3}$ are controlled by the first pulse source; the drive signal $G_{k4}$ is controlled by the second pulse source; the drive signal $G_{k2}$ is controlled by a voltage signal V_TonC1; the drive signals $G_{k5}$, $G_{k7}$ are controlled by the third pulse source; the drive signal $G_{k8}$ is controlled by the fourth pulse source; and the drive signal $G_{k6}$ is controlled by a voltage signal V_TonC4.

Control terminals of the first switch K1 and the third switch K3 are electrically connected to the first pulse source, which provides the drive signals $G_{k1}$, $G_{k3}$ at a fixed frequency to the first switch K1 and the third switch K3, respectively, so as to switch on/off the first switch K1 and the third switch K3. A control terminal of the fourth switch K4 is coupled to the second pulse source, which provides the drive signal $G_{k4}$ at a fixed frequency to the fourth switch K4 so as to switch on/off the fourth switch K4.

Control terminals of the fifth switch K5 and the seventh switch K7 are coupled to the third pulse source, which provides the drive signals $G_{k5}$, $G_{k7}$ at a fixed frequency to the first switch K5 and the third switch K7, respectively, so as to switch on/off the fifth switch K5 and the seventh switch K7. A control terminal of the eighth switch K8 is coupled to the fourth pulse source, which provides the drive signal $G_{k8}$ at a fixed frequency to the eighth switch K8 so as to switch on/off the eighth switch K8.

In the above implementation, a voltage V1 at the positive (+) input terminal of the first comparator U1 is proportional to a voltage of the second signal B, and a current output from the second current source I2 is proportional to a current of the first signal A. Moreover, a voltage V2 at the positive (+) input terminal of the second comparator U2 is proportional to a voltage of the third signal C.

In the above implementation, the drive signal $G_{k1}$ for the first switch K1 is a first pulse at a fixed frequency fs. See the waveforms in FIG. 3, where $G_{k1}=G_{k3}$ represents the first pulses, $G_{k2}$ is the drive pulse for the second switch, $G_{k4}$ is the second pulse, $G_{k5}=G_{k7}$ represents the third pulses, $G_{k6}$ is the drive pulse for the sixth switch, $G_{k8}$ is the fourth pulse, wherein $G_{k2}$ and $G_{k6}$ both have wider pulse width than each of the first, second and third pulses. $G_{k1}$ is configured to discharge the first capacitor C1 to 0V within a first preset period. Since the voltage V1 at the positive (+) input terminal of the first comparator U1 is proportional to the voltage of the second signal B, the voltage signal V_TonC1 output from the first comparator U1 has a period of fs, and is maintained at high level for a period of V1*C1/I1 that is proportional to the second signal B.

In the above implementation, the drive signal $G_{k3}$ for the third switch K3 satisfies $G_{k3}=G_{k1}$, and $G_{k3}$ is configured to discharge the second capacitor C2 to 0V within a second preset period.

In the above implementation, the drive signal $G_{k2}$ for the second switch K2 functions to control a charging duration of the second capacitor C2.

In the above implementation, the drive signal for the fourth switch K4 is denoted by $G_{k4}$, and the fourth switch K4 is electrically coupled to the third capacitor C3 so as to form a peak voltage sampling circuit. A capacitance of the third capacitor C3 is much smaller than a capacitance of the second capacitor C2, i.e., C3<<C2. The drive signal $G_{k4}$ for the fourth switch K4 comprises a plurality of rising edges aligned with a plurality of falling edges of the output signal from the first comparator U1 (see the waveforms on the right of FIG. 3).

In the above implementation, a voltage signal $V_{C3}$ across the third capacitor C3 is equal to a voltage of the reference signal Vref, i.e., $V_{C3}$=Vref. The positive input terminal of the error amplification module is configured to receive the reference signal Vref. The value of the reference signal Vref is proportional to the product of the value of the the first signal A and the value of the second signal B (V1 is proportional to the voltage of the second signal B), i.e., Vref=V1*I2 (i.e., A*B).

In the above implementation, the drive signal $G_{k5}$ for the fifth switch K5 is a pulse at a fixed frequency (fs), and $G_{k5}$=$G_{k1}$=$G_{k3}$=$G_{k7}$, and $G_{k5}$ is configured to discharge the fourth capacitor to 0 V within a third preset period.

In the above implementation, the voltage V2 at the positive (+) input terminal of the second comparator U2 is proportional to the voltage of the third signal C. Therefore, the voltage signal V_TonC4 output from the second comparator U2 has a period of fs, and is maintained at high level for a duration of V2*C4/I3 that is proportional to the voltage of the third signal C.

In the above implementation, the drive signal $G_{k7}$ for the seventh switch K7 satisfies $G_{k7}$=$G_{k5}$, and $G_{k7}$ is configured to discharge the fifth capacitor C5 to 0 V within a fourth preset period.

In the above implementation, the drive signal $G_{k6}$ for the sixth switch K6 is configured to control a charging duration of the fifth capacitor C5.

In the above implementation, the eighth switch K8 is electrically connected to the sixth capacitor C6 so as to form a peak voltage sampling circuit. A capacitance of the sixth capacitor C6 is much smaller than a capacitance of the fifth capacitor C5, i.e., C6<<C5.

In the above implementation, the drive signal $G_{k8}$ for the eighth switch K8 comprises rising edges aligned with falling edges of the output signal of the second comparator U2 as shown the waveforms on the right of FIG. 3. A voltage across the sixth capacitor C6 is equal to a voltage of the feedback signal, i.e., VC6=Vfb.

The negative (−) output terminal of the error amplification module is configured to receive the feedback signal Vfb, and the reference signal Vref is provided at the positive (+) input terminal thereof as a voltage signal. A fourth current I4 output from the output terminal of the error amplification module is equal to a current of the target signal Err.

In a steady state, the voltage of the reference signal Vref is equal to the voltage of the feedback signal Vfb, i.e., Vref=Vfb, giving the equation C1*V1*I2/(I1*C2)=C4*V2*(I5+I4)/(I3*C5). Therefore, the sum of the current from the target signal and a current from the fifth current source is proportional to the product of a capacitance of the first capacitor, the value of the second signal, the value the first signal, the value of a current from an output signal of the third current source and the capacitance of the fifth capacitor divided by the product of a current from the first current source, the capacitance of the second capacitor, a capacitance of the fourth capacitor and the voltage of the third signal, i.e., I4+I5=C1*V1*I2*I3*C5/(I1*C2*C4*V2). In other words, the sum of the current from the target signal (i.e., the fourth current I4) and the current from the fifth current I5 is proportional to a product of the value of the first signal A and the value of the second signal B divided by the value of the third signal C, i.e., I4+I5=K*A*B/C, where K is a proportional factor.

Thus, I4+I5=C1*V1*I2*I3*C5/(I1*C2* C4*V2)=K*A*B/C.

Figure 4:
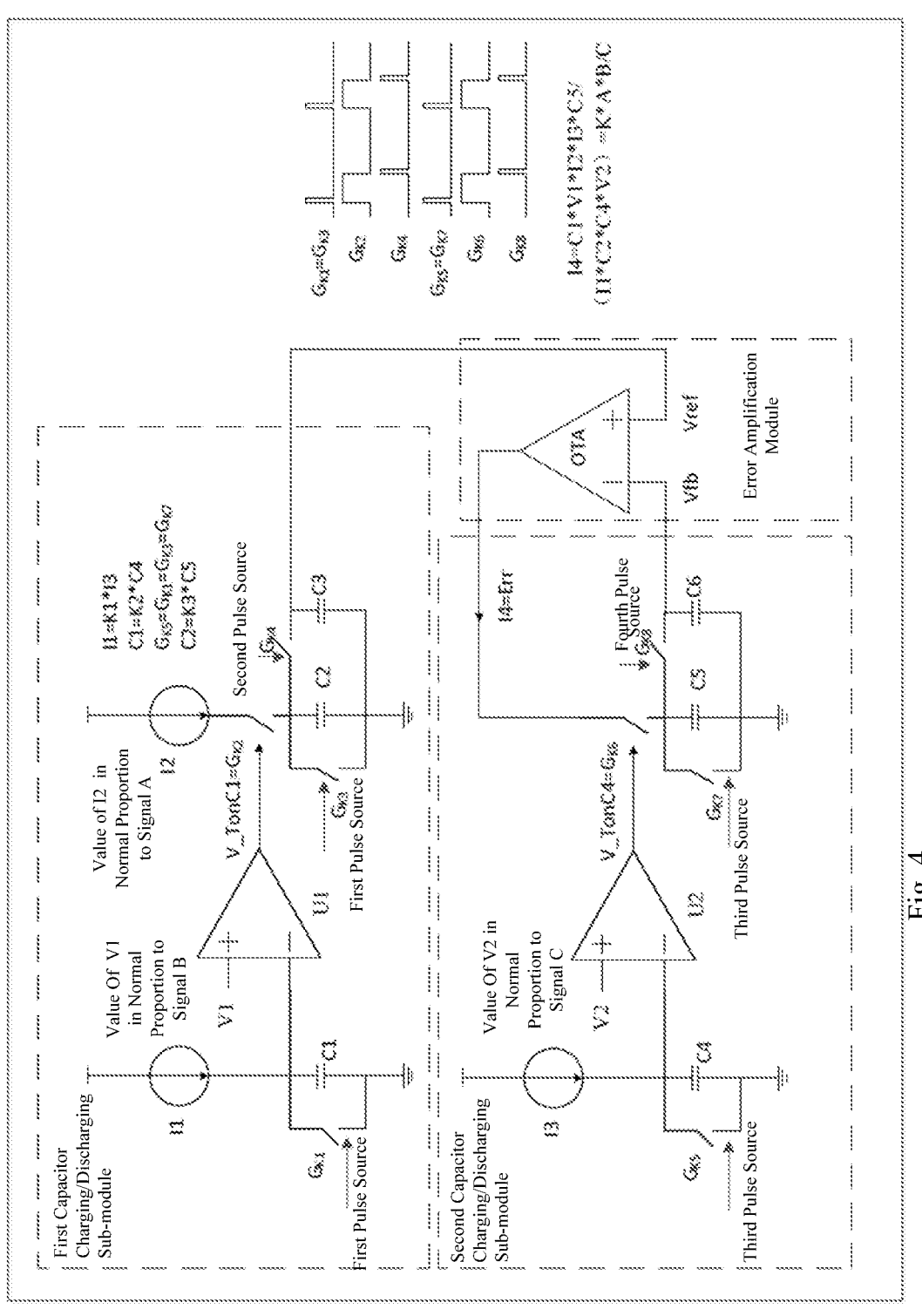
FIG. 4 is a schematic circuit diagram of another exemplary implementation of FIG. 2.

Implementation 2:

FIG. 4 is a schematic circuit diagram of another Implementation of FIG. 2.

As shown in FIG. 4, the first capacitor charging/discharging sub-module includes a first current source I1, a first capacitor C1, a first switch K1, a first comparator U1, a second switch K2, a third switch K3, a fourth switch K4, a second capacitor C2 and a third capacitor C3. The second capacitor charging/discharging sub-module includes a third current source I3, a fifth current source I5, a fifth switch K5, a fourth capacitor C4, a second comparator U2, a sixth switch K6, a seventh switch K7, an eighth switch K8, a fifth capacitor C5 and a sixth capacitor C6. The error amplification module is composed of an OTA (Operational Transimpedance Amplifier).

Connections of the components in the first capacitor charging/discharging sub-module are described below.

A first terminal of the first switch K1, a first terminal of the first capacitor C1 and a negative (−) output terminal of the first comparator U1 are electrically connected to the first current source; and a second terminal of the first switch K1 and a second terminal of the first capacitor C1 are grounded.

A positive (+) input terminal of the first comparator U1 is configured to receive the second signal B that is external to the first comparator U1, and an output terminal of the first comparator U1 is electrically connected to a control terminal of the second switch K2 to switch on/off the second switch K2. A first terminal of the second switch K2 is electrically connected to the second current source I2 to receive the first signal A; and a second terminal of the second switch K2 is electrically connected to each of a first terminal of the third switch K3, a first terminal of the second capacitor C2 and a first terminal of the fourth switch K4. A positive (+) input terminal (i.e., the first input terminal) of the error amplification module is electrically connected to a second terminal of the fourth switch K4 and a first terminal of the third capacitor C3 to enable reception of the reference signal Vref. A second terminal of the third switch K3, a second terminal of the second capacitor C2 and a second terminal of the third capacitor C3 are all grounded.

Connections of the components in the second capacitor charging/discharging sub-module are described below.

A first terminal of the fifth switch K5, a first terminal of the fourth capacitor C4 and a negative (−) output terminal of the second comparator U2 are electrically connected to an output terminal of the third current source I3, and a second terminal of the fifth switch K5 and a second terminal of the fourth capacitor C4 are grounded.

A positive (+) input terminal of the second comparator U2 is configured to receive the third signal, and an output terminal of the second comparator U2 is electrically connected to a control terminal of the sixth switch K6 to switch on/off the sixth switch. A second terminal of the sixth switch K6 is electrically connected to each of a first terminal of the seventh switch K7, a first terminal of the fifth capacitor C5 and a first terminal of the eighth switch K8. A negative (−) input terminal (i.e., second input terminal) of the error amplification module is electrically connected to both a second terminal of the eighth switch K8 and a first terminal of the sixth capacitor C6. A second terminal of the seventh switch K7, a second terminal of the fifth capacitor C5 and a second terminal of the sixth capacitor C6 are all grounded.

The output terminal of the error amplification module (from which the target signal Err is output in the form of a current I4) is electrically connected to the first terminal of the sixth switch K6.

Drive signals for the aforementioned first to eighth switches (K1-K8) are respectively denoted by $G_{k1}$, $G_{k2}$, $G_{k3}$, $G_{k4}$, $G_{k5}$, $G_{k6}$, $G_{k7}$ and $G_{k8}$.

Optionally, the first capacitor charging/discharging sub-module further includes a first pulse source and a second pulse source; and the second capacitor charging/discharging sub-module further includes a third pulse source and a fourth pulse source. In this case, the drive signals $G_{k1}$, $G_{k3}$ are controlled by the first pulse source; the drive signal $G_{k4}$ is controlled by the second pulse source; the drive signal $G_{k2}$ is controlled by a voltage signal V_TonC1; the drive signals $G_{k5}$, $G_{k7}$ are controlled by the third pulse source; the drive signal $G_{k8}$ is controlled by the fourth pulse source and the drive signal $Gk_6$ is controlled by a voltage signal V_TonC4.

Control terminals of the first switch K1 and the third switch K3 are electrically connected to the first pulse source, which provides the drive signals $G_{k1}$, $G_{k3}$ at a fixed frequency to the first switch K1 and the third switch K3, respectively, to switch on/off the first switch K1 and the third switch K3. A control terminal of the fourth switch K4 is coupled to the second pulse source, which provides the drive signal $G_{k4}$ at a fixed frequency to the first switch K4 to switch on/off the fourth switch K4.

Control terminals of the fifth switch K5 and the seventh switch K7 are coupled to the third pulse source, which provides the drive signals $G_{k5}$, $G_{k7}$ at a fixed frequency to the first switch K5 and the third switch K7, respectively, so as to switch on/off the fifth switch K5 and the seventh switch K7. A control terminal of the eighth switch K8 is coupled to the fourth pulse source, which provides the drive signal $G_{k8}$ at a fixed frequency to the first switch K8 so as to switch on/off the eighth switch K8.

In the above implementation 2, a voltage V1 at the positive (+) input terminal of the first comparator U1 is proportional to a voltage of the second signal B, and a current output from the second current source I2 is proportional to a current of the first signal A. Moreover, a voltage V2 at the positive (+) input terminal of the second comparator U2 is proportional to a voltage of the third signal C.

In the above implementation 2, the drive signal $G_{k1}$ for the first switch K1 is a first pulse at a fixed frequency fs. See the waveforms on the right of FIG. 4, where $G_{k1}$=$G_{k3}$ represents the first pulses, $G_{k2}$ is the drive pulse for the second switch, $G_{k4}$ is the second pulse, $G_{k5}$=$G_{k7}$ represents the third pulses, $G_{k6}$ is the drive pulse for the sixth switch, $G_{k8}$ is the fourth pulse, and $G_{k2}$ and $G_{k6}$ both have wider pulse width than each of the first, second and third pulses. $G_{k1}$ functions to discharge the first capacitor C1 to 0V within a first preset period. Since the voltage V1 at the positive (+) input terminal of the first comparator U1 is proportional to the voltage of the second signal B, the voltage signal V_TonC1 output from the first comparator U1 has a period of fs, and is maintained at high level for a period of V1*C1/I1 that is proportional to the second signal B.

In the above implementation 2, the drive signal $G_{k3}$ for the third switch K3 satisfies $G_{k3}$=$G_{k1}$, and $G_{k3}$ is configured to discharge the second capacitor C2 to 0V within a second preset period.

In the above implementation 2, the drive signal $G_{k2}$ for the second switch K2 is configured to control a charging duration of the second capacitor.

In the above implementation 2, the drive signal for the fourth switch K4 is denoted by $G_{k4}$, and the fourth switch K4 is electrically coupled to the third capacitor C3 so as to form a peak voltage sampling circuit. A capacitance of the third capacitor C3 is much smaller than a capacitance of the second capacitor C2, i.e., C3<<C2. The drive signal $G_{k4}$ for the fourth switch K4 is the second pulse which comprises rising edges aligned with falling edges of the drive signal $G_{k2}$ of the second switch K2 (see the waveforms on the right of FIG. 4).

In the above implementation 2, a voltage signal $V_{C3}$ across the third capacitor C3 is equal to a voltage of the reference signal Vref, i.e., $V_{C3}$=Vref. The positive input terminal of the error amplification module is configured to receive the reference signal Vref. The voltage of the reference signal Vref is proportional to the product of the value of the first signal A and the value of the second signal B (V1 is proportional to the voltage of the second signal B), i.e., Vref=V1*I2 (i.e., A*B).

In the above implementation 2, the drive signal $G_{k5}$ for the fifth switch K5 is a pulse at a fixed frequency fs, satisfying $G_{k5}$=$G_{k1}$=$Gk_3$=$Gk_7$, wherein $G_{k5}$ is configured to discharge the fourth capacitor to 0 V within a third preset period.

In the above implementation 2, the voltage V2 at the positive (+) input terminal of the second comparator U2 is proportional to the voltage of the third signal C. Therefore, the voltage signal V_TonC4 output from the second comparator U2 has a period of fs, and it is maintained at high level for a period of V2*C4/I3 that is proportional to the voltage of the third signal C.

In the above implementation 2, the drive signal $Gk_7$ for the seventh switch K7 satisfies $G_{k7}$=$G_{k5}$, and $G_{k7}$ is configured to discharge the fifth capacitor C5 to 0 V within a fourth preset period.

In the above implementation 2, the drive signal $G_{k6}$ for the sixth switch K6 is configured to control a charging duration of the fifth capacitor C5.

In the above implementation 2, the eighth switch K8 is electrically connected to the sixth capacitor C6 so as to form a peak voltage sampling circuit. A capacitance of the sixth capacitor C6 is much smaller than a capacitance of the fifth capacitor C5, i.e., C6<<C5.

In the above implementation 2, the drive signal $G_{k8}$ for the eighth switch K8 is the fourth pulse, which comprises rising edges aligned with falling edges of the second pulse (see the waveform on the right of FIG. 4). A voltage across the sixth capacitor C6 is equal to a voltage of the feedback signal, i.e., $V_{C6}$=Vfb.

The negative (−) input terminal of the error amplification module is configured to receive the feedback signal Vfb, and the reference signal Vref is provided at the positive (+) input terminal thereof as a voltage signal. A fourth current I4 output from the output terminal of the error amplification module is equal to a current of the target signal Err.

In a steady state, the voltage of the reference signal Vref is equal to the voltage of the feedback signal Vfb, i.e., Vref=Vfb and C1*V1*I2/(I1*C2)=C4*V2*I4/(I3*C5). Therefore, the current of the target signal is proportional to the product of a capacitance of the first capacitor, the voltage of the second signal, the current of the first signal, a current of an output signal of the third current source and the capacitance of the fifth capacitor divided by the product of a current of an output signal of the first current source, the capacitance of the second capacitor, a capacitance of the fourth capacitor and the voltage of the third signal, i.e., I4=C1*V1*I2*I3*C5/(I1*C2*C4*V2). In other words, the current of the target signal is proportional to a product of K, the current of the first signal A and the voltage of the second signal B divided by the voltage of the third signal C, i.e., I4=K*A*B/C, where K is a preset proportional factor.

Optionally, a current of the target signal is proportional to a product of the current of the first signal A and the voltage of the second signal B divided by the voltage of the third signal C.

$$\text{Thus, } I4=C1*V1*I2*I3*C5/(I1*C2*C4*V2)= K*A*B/C.$$

Implementation 2 differs from Implementation 1 in that the fifth current source I5 is omitted in Implementation 2 in comparison to Implementation 1.

Thus, it can be seen that the circuits of Implementation 1 and Implementation 2 can readily implement the operation circuit of the present invention.

Figure 5:
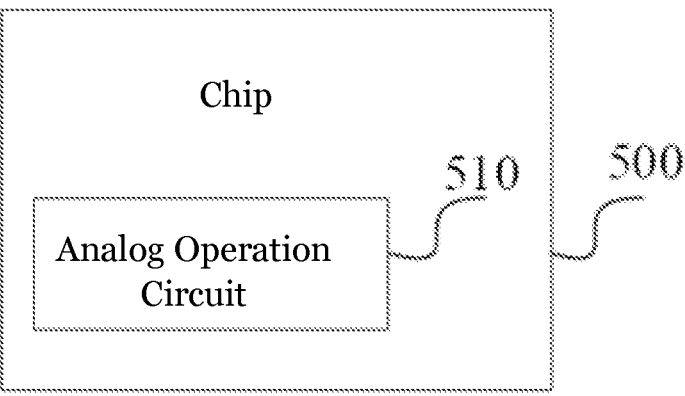
FIG. 5 is a schematic diagram of a chip proposed in the present invention.

FIG. 5 is a schematic diagram of the chip proposed in the present invention. As shown in FIG. 5, the chip 500 of the present invention includes the operation circuit 510 as defined above.

Reference can be made to the above description for structural details of the operation circuit 510, and a further description thereof is omitted here.

Through incorporating the operation circuit 510, the chip 500 can be suitably used in more electronics applications for multiplication and division operations of electrical signals.

Finally, it is to be noted that the foregoing embodiments are provided merely to illustrate the present invention and are not intended to limit it in any sense. Although the present invention has been described in detail with reference to the above embodiments, those of ordinary skill in the art will appreciate that modifications to those embodiments are still possible, or all or some of the technical features thereof can be equivalently substituted, without causing the essence of them to depart from the scope of the various embodiments of the present invention.

What is claimed is:

1. An operation circuit, comprising: a capacitor charging/discharging module; and an error amplification module electrically connected to the capacitor charging/discharging module, wherein:

the capacitor charging/discharging module is configured to receive a first signal, a second signal and a third signal that are external to the capacitor charging/discharging module, and to output a reference signal and a feedback signal;

the error amplification module is configured to: receive the reference and feedback signals and output a target signal to the capacitor charging/discharging module based on the received reference and feedback signals;

wherein all the first, second and third signals are analog signals, and in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal, wherein the capacitor charging/discharging module comprises a first capacitor charging/discharging sub-module and a second capacitor charging/discharging sub-module, wherein the first capacitor charging/discharging sub-module is configured to: receive the first and second signals and output the reference signal to the error amplification module based on the first and second signals, wherein the error amplification module is electrically connected to the first capacitor charging/discharging sub-module and is configured to: calculate an error between the reference and feedback signals and output the target signal, and wherein the reference signal is output from the first capacitor charging/discharging sub-module and the feedback signal is output from the second capacitor charging/discharging sub-module, wherein the second capacitor charging/discharging sub-module is electrically connected to the error amplification module and is configured to: receive the third and target signals and output the feedback signal based on the third and target signals.

2. The operation circuit according to claim 1, wherein the first capacitor charging/discharging sub-module comprises: a first current source, a first capacitor, a first switch, a first comparator, a second switch, a third switch, a fourth switch, a second capacitor and a third capacitor; and wherein the second capacitor charging/discharging sub-module comprises: a third current source, a fifth switch, a fourth capacitor, a second comparator, a sixth switch, a seventh switch, an eighth switch, a fifth capacitor and a sixth capacitor, wherein: a first terminal of the first switch, a first terminal of the first capacitor and a negative input terminal of the first comparator are electrically connected to the first current source; a second terminal of the first switch and a second terminal of the first capacitor are grounded; a positive input terminal of the first comparator is configured to receive the second signal; an output terminal of the first comparator is electrically connected to a control terminal of the second switch to switch on/off the second switch; a first terminal of the second switch is electrically connected to the second current source to receive the first signal; a second terminal of the second switch is electrically connected to each of a first terminal of the third switch, a first terminal of the second capacitor and a first terminal of the fourth switch; a first input terminal of the error amplification module is electrically connected to a second terminal of the fourth switch and a first terminal of the third capacitor to receive the reference signal; and a second terminal of the third switch, a second terminal of the second capacitor and a second terminal of the third capacitor are grounded, wherein: a first terminal of the fifth switch, a first terminal of the fourth capacitor and a negative input terminal of the second comparator are electrically connected to an output terminal of the third current source; a second terminal of the fifth switch and a second terminal of the fourth capacitor are grounded; a positive input terminal of the second comparator is configured to receive the third signal, and an output terminal of the second comparator is electrically connected to a control terminal of the sixth switch to switch on/off the sixth switch; a second terminal of the sixth switch is electrically connected to each of a first terminal of the seventh switch, a first terminal of the fifth capacitor and a first terminal of the eighth switch; a second input terminal of the error amplification module is electrically connected to a second terminal of the eighth switch and a first terminal of the sixth capacitor to receive the feedback signal; and a second terminal of the seventh switch, a second terminal of the fifth capacitor and a second terminal of sixth capacitor are grounded, and wherein an output terminal of the error amplification module is electrically connected to a first terminal of the sixth switch to output the target signal.

3. The operation circuit according to claim 2, wherein the first capacitor charging/discharging sub-module further comprises a first pulse source and a second pulse source, and wherein the second capacitor charging/discharging sub-module further comprises a third pulse source and a fourth pulse source, wherein: a control terminal of the first switch and a control terminal of the third switch are electrically connected to the first pulse source to receive a first pulse at a fixed frequency so as to switch on/off the first and third switches; and a control terminal of the fourth switch is coupled to the second pulse source to receive a second pulse at a fixed frequency so as to switch on/off the fourth switch, and wherein the second pulse comprises a plurality of rising edges aligned with a plurality of falling edges of a signal output from the first comparator, and wherein a control terminal of the fifth switch and a control terminal of seventh switch are coupled to the third pulse source to receive a third pulse at a fixed frequency so as to switch on/off the fifth and seventh switches; and a control terminal of the eighth switch is coupled to the fourth pulse source to receive a fourth pulse at a fixed frequency so as to switch on/off the eighth switch, and wherein the fourth pulse comprises a plurality of rising edges aligned with a plurality of falling edges of a signal output from the second comparator.

4. The operation circuit according to claim 3, wherein the first switch is configured to discharge the first capacitor within a first preset period, wherein a capacitance of the second capacitor is proportional to a capacitance of the first capacitor, wherein the third switch is configured to discharge the second capacitor within a second preset period, wherein the signal output from the first comparator controls a charging duration of the second capacitor by switching the second switch on/off, wherein the fourth switch and the third capacitor form a peak voltage sampling circuit, and wherein a capacitance of the third capacitor is much smaller than the capacitance of the second capacitor, wherein the fifth switch is configured to discharge the fourth capacitor within a third preset period, wherein a capacitance of the fifth capacitor is proportional to a capacitance of the fourth capacitor, wherein the seventh switch is configured to discharge the fifth capacitor within a fourth preset period, wherein the signal output from the second comparator controls a charging duration of the fifth capacitor by switching the sixth switch on/off, wherein the eighth switch and the sixth capacitor form a peak voltage sampling circuit, and wherein a capacitance of the sixth capacitor is much smaller than the capacitance of the fifth capacitor, and wherein the error amplification module comprises an OTA.

5. The operation circuit according to claim 4, wherein a value of the target signal is proportional to a product of the capacitance of the first capacitor, the value of the second signal, the value of the first signal, a value of a signal output from the third current source and the capacitance of the fifth capacitor divided by a product of a value of a signal output from the first current source, the capacitance of the second capacitor, the capacitance of the fourth capacitor and the value of the third signal.

6. The operation circuit according to claim 5, wherein the second capacitor charging/discharging sub-module further comprises a fifth current source, and wherein an output terminal of the fifth current source is electrically connected to the first terminal of the sixth switch and the output terminal of the error amplification module.

7. The operation circuit according to claim 6, wherein a sum of the value of the target signal and a value of a signal output from the fifth current source is proportional to a product of the capacitance of the first capacitor, the value of the second signal, the value of the first signal, the value of the signal output from the third current source and the capacitance of the fifth capacitor divided by a product of the value of the signal output from the first current source, the capacitance of the second capacitor, the capacitance of the fourth capacitor and the value of the third signal.

8. A chip comprising the operation circuit, wherein the operation circuit comprises: a capacitor charging/discharging module; and an error amplification module electrically connected to the capacitor charging/discharging module, wherein:

the capacitor charging/discharging module is configured to receive a first signal, a second signal and a third signal that are external to the capacitor charging/discharging module, and to output a reference signal and a feedback signal;

the error amplification module is configured to: receive the reference and feedback signals and output a target signal to the capacitor charging/discharging module based on the received reference and feedback signals;

wherein all the first, second and third signals are analog signals, and in a steady state, a value of the target signal, a value of the first signal, a value of the second signal and a value of the third signal satisfy a predefined mathematical relationship comprising a factor, the predefined mathematical relationship including a product of the value of the first signal and the value of the second signal divided by the value of the third signal, wherein the capacitor charging/discharging module comprises a first capacitor charging/discharging sub-module and a second capacitor charging/discharging sub-module, wherein the first capacitor charging/discharging sub-module is configured to: receive the first and second signals and output the reference signal to the error amplification module based on the first and second signals, wherein the error amplification module is electrically connected to the first capacitor charging/discharging sub-module and is configured to: calculate an error between the reference and feedback signals and output the target signal, and wherein the reference signal is output from the first capacitor charging/discharging sub-module and the feedback signal is output from the second capacitor charging/discharging sub-module, wherein the second capacitor charging/discharging sub-module is electrically connected to the error amplification module and is configured to: receive the third and target signals and output the feedback signal based on the third and target signals.

9. The chip according to claim 8, wherein the first capacitor charging/discharging sub-module comprises: a first current source, a first capacitor, a first switch, a first comparator, a second switch, a third switch, a fourth switch, a second capacitor and a third capacitor; and wherein the second capacitor charging/discharging sub-module comprises: a third current source, a fifth switch, a fourth capacitor, a second comparator, a sixth switch, a seventh switch, an eighth switch, a fifth capacitor and a sixth capacitor, wherein: a first terminal of the first switch, a first terminal of the first capacitor and a negative input terminal of the first comparator are electrically connected to the first current source; a second terminal of the first switch and a second terminal of the first capacitor are grounded; a positive input terminal of the first comparator is configured to receive the second signal; an output terminal of the first comparator is electrically connected to a control terminal of the second switch to switch on/off the second switch; a first terminal of the second switch is electrically connected to the second current source to receive the first signal; a second terminal of the second switch is electrically connected to each of a first terminal of the third switch, a first terminal of the second capacitor and a first terminal of the fourth switch; a first input terminal of the error amplification module is electrically connected to a second terminal of the fourth switch and a first terminal of the third capacitor to receive the reference signal; and a second terminal of the third switch, a second terminal of the second capacitor and a second terminal of the third capacitor are grounded, wherein: a first terminal of the fifth switch, a first terminal of the fourth capacitor and a negative input terminal of the second comparator are electrically connected to an output terminal of the third current source; a second terminal of the fifth switch and a second terminal of the fourth capacitor are grounded; a positive input terminal of the second comparator is configured to receive the third signal, and an output terminal of the second comparator is electrically connected to a control terminal of the sixth switch to switch on/off the sixth switch; a second terminal of the sixth switch is electrically connected to each of a first terminal of the seventh switch, a first terminal of the fifth capacitor and a first terminal of the eighth switch; a second input terminal of the error amplification module is electrically connected to a second terminal of the eighth switch and a first terminal of the sixth capacitor to receive the feedback signal; and a second terminal of the seventh switch, a second terminal of the fifth capacitor and a second terminal of sixth capacitor are grounded, and wherein an output terminal of the error amplification module is electrically connected to a first terminal of the sixth switch to output the target signal.

10. The chip of claim 9, wherein the first capacitor charging/discharging sub-module further comprises a first pulse source and a second pulse source, and wherein the second capacitor charging/discharging sub-module further comprises a third pulse source and a fourth pulse source, wherein: a control terminal of the first switch and a control terminal of the third switch are electrically connected to the first pulse source to receive a first pulse at a fixed frequency so as to switch on/off the first and third switches; and a control terminal of the fourth switch is coupled to the second pulse source to receive a second pulse at a fixed frequency so as to switch on/off the fourth switch, and wherein the second pulse comprises a plurality of rising edges aligned with a plurality of falling edges of a signal output from the first comparator, and wherein a control terminal of the fifth switch and a control terminal of seventh switch are coupled to the third pulse source to receive a third pulse at a fixed frequency so as to switch on/off the fifth and seventh switches; and a control terminal of the eighth switch is coupled to the fourth pulse source to receive a fourth pulse at a fixed frequency so as to switch on/off the eighth switch, and wherein the fourth pulse comprises a plurality of rising edges aligned with a plurality of falling edges of a signal output from the second comparator.

11. The chip of claim 10, wherein the first switch is configured to discharge the first capacitor within a first preset period, wherein a capacitance of the second capacitor is proportional to a capacitance of the first capacitor, wherein the third switch is configured to discharge the second capacitor within a second preset period, wherein the signal output from the first comparator controls a charging duration of the second capacitor by switching the second switch on/off, wherein the fourth switch and the third capacitor form a peak voltage sampling circuit, and wherein a capacitance of the third capacitor is much smaller than the value of the second capacitor, wherein the fifth switch is configured to discharge the fourth capacitor within a third preset period, wherein a capacitance of the fifth capacitor is proportional to a capacitance of the fourth capacitor, wherein the seventh switch is configured to discharge the fifth capacitor within a fourth preset period, wherein the signal output from the second comparator controls a charging duration of the fifth capacitor by switching the sixth switch on/off, wherein the eighth switch and the sixth capacitor form a peak voltage sampling circuit, and wherein a capacitance of the sixth capacitor is much smaller than the capacitance of the fifth capacitor, and wherein the error amplification module comprises OTA.

12. The chip of claim 11, wherein a value of the target signal is proportional to a product of the capacitance of the first capacitor, the value of the second signal, the value of the first signal, a value of a signal output from the third current source and the capacitance of the fifth capacitor divided by a product of a value of a signal output from the first current source, the capacitance of the second capacitor, the capacitance of the fourth capacitor and the value of the third signal.

13. The chip of claim 12, wherein the second capacitor charging/discharging sub-module further comprises a fifth current source, and wherein an output terminal of the fifth current source is electrically connected to the first terminal of the sixth switch and the output terminal of the error amplification module.

14. The chip of claim 13, wherein a sum of the value of the target signal and a value of a signal output from the fifth current source is proportional to a product of the capacitance of the first capacitor, the value of the second signal, the value of the first signal, the value of the signal output from the third current source and the capacitance of the fifth capacitor divided by a product of the value of the signal output from the first current source, the capacitance of the second capacitor, the capacitance of the fourth capacitor and the value of the third signal.

* * * * *